W. H. PEIRCE,

Assignor, by Mesne Assignments, to R. A. Cook.

Mincing-Machine.

No. 8,823. Reissued July 29, 1879.

Witnesses
E. S. Kramer.
M. Church

Inventor.
William H. Peirce
by his attys
Ann Fellowes.

N. PETERS, PHOTO-LITHOGRAPHER, WASHINGTON, D. C.

UNITED STATES PATENT OFFICE.

WILLIAM H. PEIRCE, OF WORCESTER, MASSACHUSETTS, ASSIGNOR, BY MESNE ASSIGNMENTS, TO RUTH A. COOK.

IMPROVEMENT IN MINCING-MACHINES.

Specification forming part of Letters Patent No. 94,237, dated August 31, 1869; Reissue No. 8,823, dated July 29, 1879; application filed January 6, 1875.

*To all whom it may concern:*

Be it known that I, WILLIAM H. PEIRCE, of Bangor, in the county of Penobscot, in the State of Maine, have invented a new and useful Mincing-Machine; and I do hereby declare that the following, taken in connection with the drawings which accompany and form part of this specification, is a description of my invention sufficient to enable those skilled in the art to which it appertains to practice it.

This invention relates to that class of machines which are employed for mincing or fine-cutting meat, vegetables, and other articles of food.

The invention consists, first, in the employment of an inclined cutting knife or blade rotated about a vertical axis; secondly, in combining such knife with a vessel or hopper in which it operates, and constructing the knife and hopper so that the knife will operate at the side of the vessel, and so that all portions of the food in the vessel will in the course of its operation be brought in contact with it, or, in other words, so that it will traverse the entire circumference of the vessel, and act upon all portions of the contents thereof; thirdly, in combining an inclined rotary knife with an inclosing-vessel, so that its edges will rotate in contact with the walls of the vessel, and constructing the blade of the knife in an elliptical or elongated form, so that as the knife is rotated its edge will bear uniformly against the walls of the vessel; fourthly, in combining an inclined elliptical rotary blade, which revolves about a vertical axis, with a surrounding cylindrical or circular vessel, against the inner wall of which the knife is adapted to bear constantly while being rotated about its vertical axis; fifthly, in combining a rotary knife arranged inside of a cylindrical or circular vessel with a spring adapted to hold the knife-blade against the wall of the inclosing-vessel; sixthly, in combining a rotary knife and inclosing-vessel and the spring in such manner that as the vertical shaft which supports the knife is rotated the friction of the knife against the sides of the vessel shall operate effectively to bring all parts of the food contained in the vessel in contact with the edges of the blade; seventhly, in the combined mechanism adapted to produce the results above referred to.

Figure 1:
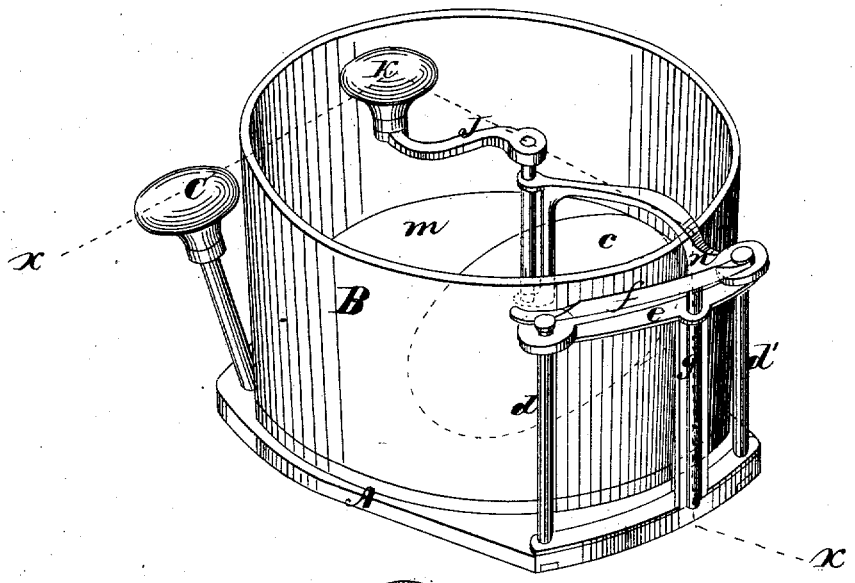
Figure 2:
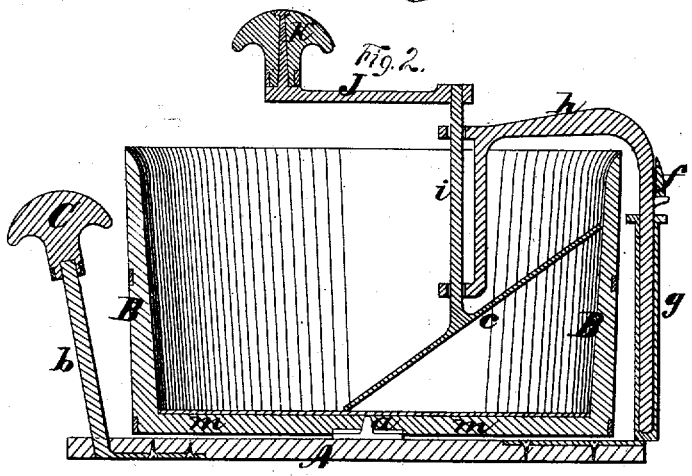

In the drawings, Figure 1 is a perspective view. Fig. 2 is a vertical section taken in line *x x*, Fig. 1.

Similar letters of reference indicate the same parts.

A represents the base, which may be of any suitable form, as convenience may require.

*a* is a short pivot secured to the base A, and upon which the dish or inclosing-vessel B revolves, the contact being plainly shown in Fig. 2. *b* is a short rod attached to the base A, having a knob, C, fastened upon it for convenience of holding when in use. *d d'* are also two rods rigidly secured to the base A, and *e* is a bar secured to these rods, as is shown. *g* is a tube which extends from the bar *e* to base A. In this tube is inserted the rounded portion of the bracket *h*, which moves freely in the tube. A part of the bracket *h* extends down into the dish B, so as to form two bearings, in which a vertical shaft, *i*, freely revolves. Upon the lower end of the shaft *i* is secured the inclined cutting-blade *c*, as shown in Fig. 2. A spring, *f*, is employed to hold the cutting-edge of the blade *c* in constant contact with the inner wall of the dish or vessel B. As here shown, the spring accomplishes this result by its action against the knuckle *n*, formed upon the outer end of the bracket *h*, as will be clearly understood from Fig. 1.

In use, the machine may be either set upon a table or held in the lap, when, taking hold of the knob K, secured to the crank J, and thereby rotating the shaft *i*, the blade *c* may be easily and rapidly revolved upon its vertical axis. As the blade revolves, the contact thereof with the side of the dish serves to revolve the latter; and as the point of contact between the two is constantly changing from the lowest to the highest point reached by the blade, therefore these two changes serve to bring all parts of the material being minced under the action of the blade without the bestowal of any care by the operator to that end. Were the blade perfectly circular in its own outline, its inclination with respect to its axis of revolution would bring the upper and lower parts of its edge nearer to the axis than the other parts of the edge, or, in other words, the revolution of the blade about such axis would not cause it to describe the section of a true cylinder. It would, therefore, at one part of its revolution bear with great force against the wall of the vessel, while at another part of its revolution it might not bear at all against the vessel, and, in consequence thereof, its action would be irregular and defective.

To remedy the difficulty referred to, I make the cutting-blades elliptical in form, and I regulate the degree of their ellipticity in exact proportion to the inclination of the blades to their axes of revolution, so that the cutting-blade will always obliquely bisect a true vertical cylinder, the outline of its edge exactly coinciding to the outline of its cylinder, in which case the blade always bears with a uniform pressure against the wall of the surrounding vessel, and its operation is as regular and equable as would be the operation of a circular horizontal disk.

Having thus described my invention, I claim as new—

1. An inclined cutter-blade supported by and rotating with a vertical shaft within an inclosing dish or vessel, substantially as described, for the purpose specified.

2. An inclined elliptical blade supported by and rotating with a vertical shaft within an inclosing dish or vessel, substantially as described, for the purpose specified.

3. An inclined blade rotating about a vertical axis within an inclosing-vessel, in combination with a spring for holding the edge of the blade against the wall of said inclosing-vessel, substantially as described.

4. The combination of an inclined blade rotating about a vertical axis within an inclosing-vessel with a spring which operates to hold the blade against the inner wall of said vessel, said parts being constructed and arranged so that the revolution of the shaft which supports the knife-blade will cause the point of contact between the blade and the dish to change from the lowest to the highest point reached by the blade, and will cause the blade to come in contact with the food throughout the entire circumference of the vessel, substantially as described.

5. A cylindrical or circular inclosing-vessel combined with an inclined rotary blade which constantly bears against the inner wall thereof, substantially as described.

6. An inclined rotary knife and a vertical shaft by which the knife is supported, and with which it rotates, combined with a horizontal supporting-arm having an independent axis of rotation, substantially as described.

7. An inclined rotary knife and a vertical shaft by which the knife is supported, and with which it rotates, combined with a horizontal supporting-arm having an independent axis of rotation, and with a spring operating in connection with the horizontal arm to give the knife a yielding pressure against the inner wall of the vessel in which it operates, substantially as described.

WILLIAM H. PEIRCE.

Witnesses:
JOSEPH WHITAKER,
C. W. RICE.